(12) United States Patent
Gerez et al.

(10) Patent No.: US 7,238,400 B2
(45) Date of Patent: Jul. 3, 2007

(54) FLAT TEXTILE STRIP FORMING ONE LAYER OF A FLEXIBLE DUCT THAT IS USED FOR HYDROCARBON TRANSPORT AND THE DUCT THUS FORMED

(75) Inventors: Jean-Michel Gerez, Paris (FR); Christophe Dieumegard, Maisons-Laffitte (GB)

(73) Assignee: Technip France (FR)

( * ) Notice: Subject to any disclaimer, the term of this patent is extended or adjusted under 35 U.S.C. 154(b) by 131 days.

(21) Appl. No.: 10/486,814

(22) PCT Filed: Aug. 14, 2002

(86) PCT No.: PCT/FR02/02876

§ 371 (c)(1),
(2), (4) Date: Feb. 13, 2004

(87) PCT Pub. No.: WO03/016770

PCT Pub. Date: Feb. 27, 2003

(65) Prior Publication Data

US 2004/0175523 A1    Sep. 9, 2004

(30) Foreign Application Priority Data

Aug. 14, 2001   (FR) .................................. 01 10818

(51) Int. Cl.
*B32B 1/08* (2006.01)
*F16L 11/00* (2006.01)

(52) U.S. Cl. .................. 428/36.9; 428/34.1; 428/35.7; 428/35.8; 428/36.1; 428/36.2; 428/36.3; 428/36.91; 138/129; 138/134; 138/137

(58) Field of Classification Search ............... 428/34.1, 428/35.7, 35.8, 35.9, 36.1, 36.2, 36.3, 36.4, 428/36.9, 36.91, 36.92; 138/118, 129, 131, 138/134, 137, 138, 139, 140, 150, 153, 154, 138/172
See application file for complete search history.

(56) References Cited

U.S. PATENT DOCUMENTS 2,129,110 A * 9/1938 Weaver ....................... 428/104

FOREIGN PATENT DOCUMENTS

| EP | 0 853 547 | 7/1998 |
| FR | 2 743 614 | 7/1997 |
| JP | 59 035924 | 2/1984 |

OTHER PUBLICATIONS

International Search Report.
English Abstract for France No. 2 743 614.

* cited by examiner

*Primary Examiner*—Jennifer McNeil
*Assistant Examiner*—Walter B Aughenbaugh
(74) *Attorney, Agent, or Firm*—Ostrolenk, Faber, Gerb & Soffen, LLP

(57) ABSTRACT

A pipe for transporting hydrocarbons including textile tape of fibers or fiber windings having a thicker central section and thinner longitudinal edge regions, the tape being wound in a helical winding.

7 Claims, 3 Drawing Sheets

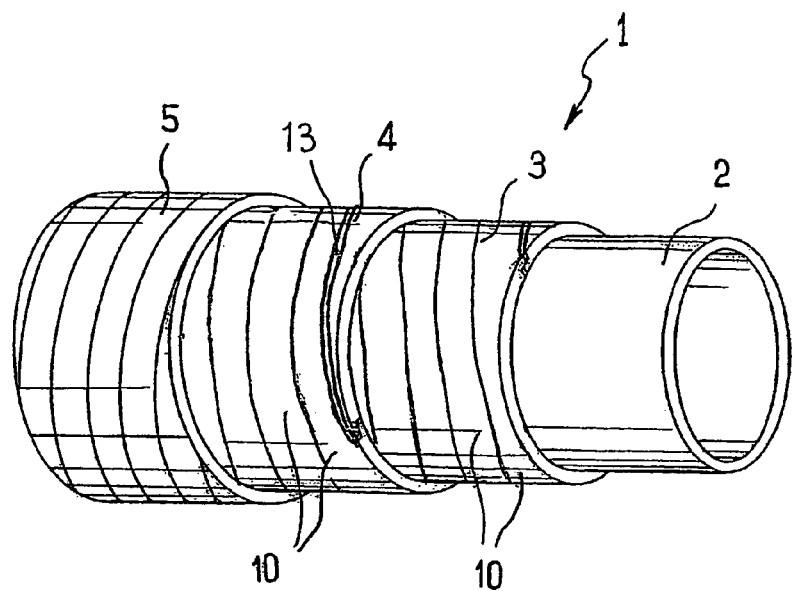
FIG_1
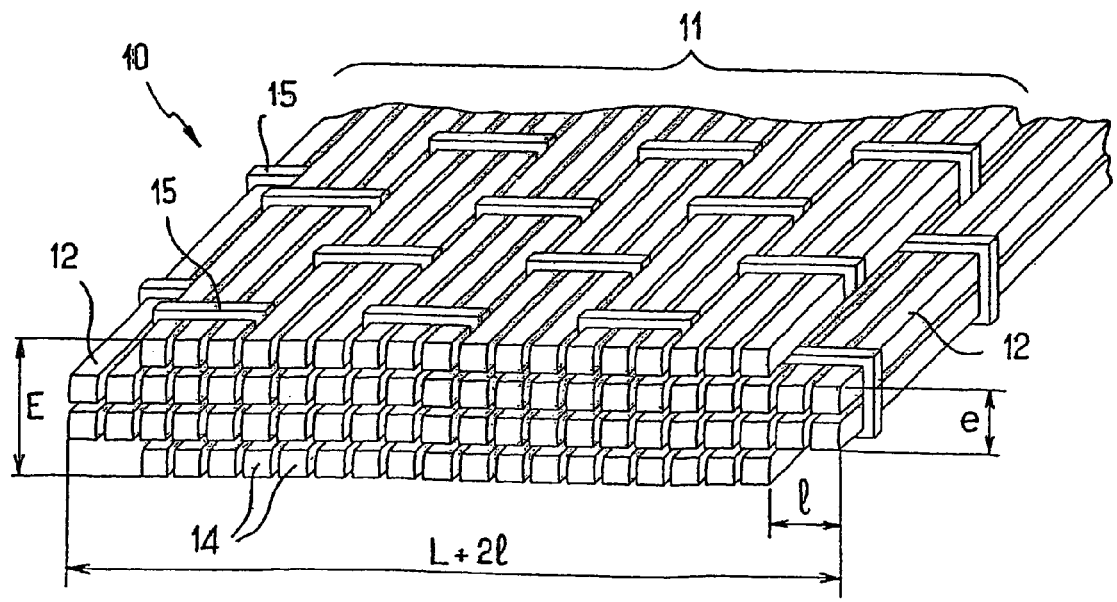
FIG_2

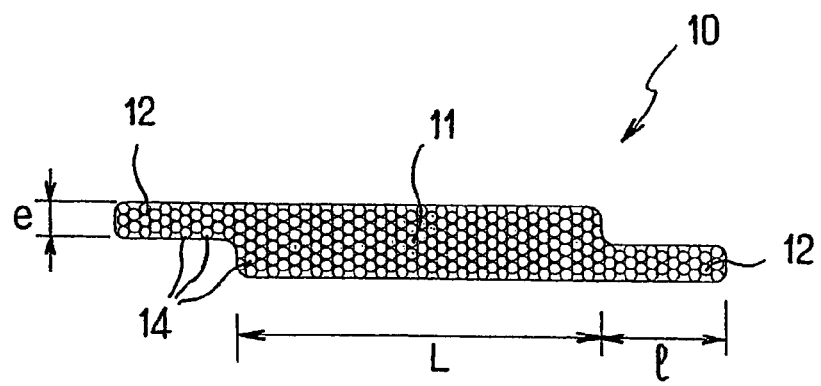
FIG_3
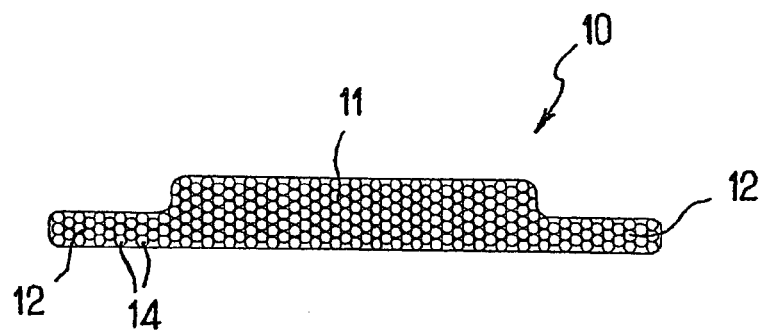
FIG_4
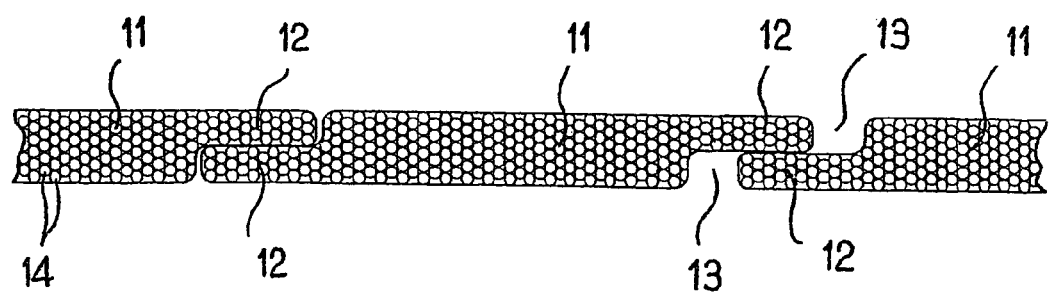
FIG_5

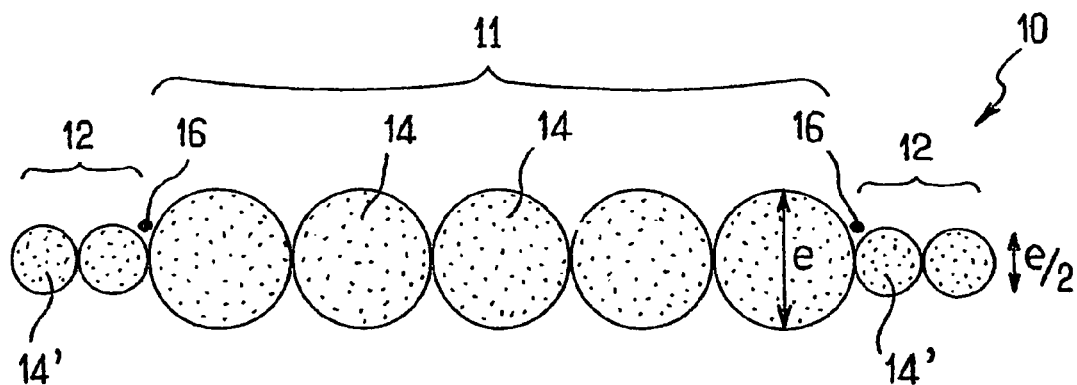
FIG_6
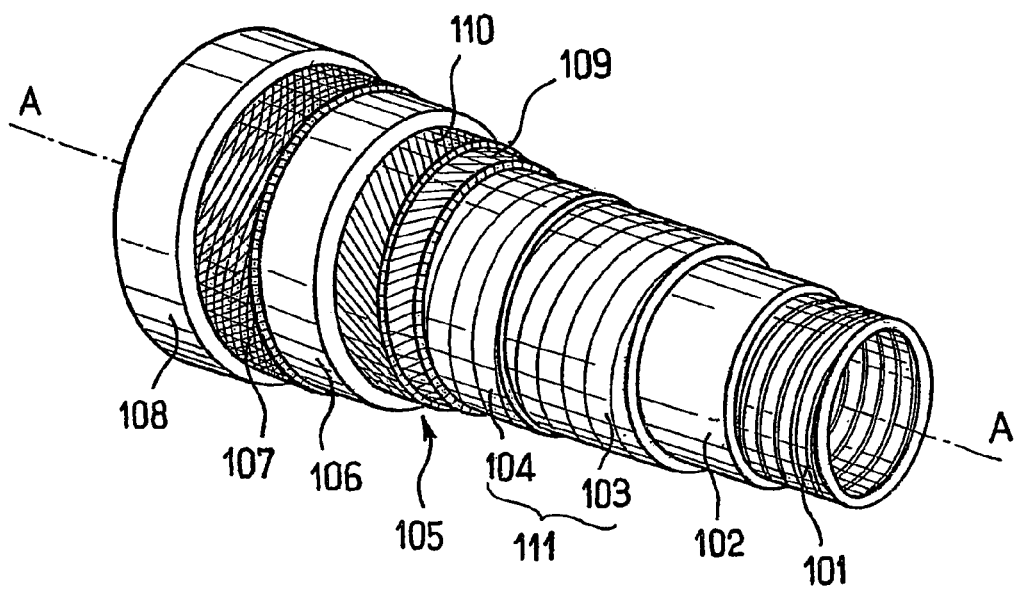
FIG_7

FLAT TEXTILE STRIP FORMING ONE LAYER OF A FLEXIBLE DUCT THAT IS USED FOR HYDROCARBON TRANSPORT AND THE DUCT THUS FORMED

BACKGROUND OF THE INVENTION

The present invention relates to a flat tape intended for the manufacture of one layer of a flexible pipe for subsea transport of hydrocarbons and gases, especially an unbonded flexible pipe of the offshore type as defined in the API 17B and 17J recommendations of the American Petroleum Institute.

Such pipes are formed from layers—partly metallic and partly polymeric—that are not bonded together. These pipes have at least one polymeric pressure sheath surrounded by a pressure vault, at least partly produced by the helical winding of elongate metal elements leaving a slight clearance between their turns called the "inter-turn gap" or "gap" (generally at least one layer of elongate metal elements, especially profiled wires, wound with a short pitch) and one or more plies of reinforcing elements wound with a long pitch.

One of the problems encountered in practice is creep of the pressure sheath into the gaps existing between the turns of the pressure vault. This creep takes place owing to the combined effect of the internal pressure and of the temperature of the fluid transported in the pipe. Depending on the effluent and its temperature, the plastic sheaths used may, for example, be produced from materials of the polyvinylidene fluoride PVDF type (for example the coatings known under the brand names Coflon® and Gammaflex®, for applications at relatively high temperatures, typically above 80° C.). These materials have a tendency to undergo relatively substantial creep into the inter-turn gaps of the vault. This creep leads to the formation of creep pips in the gaps.

In dynamic applications, such as in risers, these pips are a source of fracture initiation because of the movements of the vault turns which tend to shear these pips.

One solution commonly used for trying to solve the creep problems is the production of anticreep layers as described in document FR 2 743 614, which covers the specific end-fitting of such pipes. These layers are expensive in terms of raw materials, but also in terms of production costs.

Another solution envisioned for solving this problem could consist in using a conventional tape wound with a short pitch around the pressure sheath, the tape being intended to prevent said sheath from creeping. However, this solution is excessively difficult to implement for the following reasons.

The overlapping of a tape with a unidirectional fiber during short-pitch taping would induce an overstress in the fibers at the overlapping part, resulting in substantial deterioration in the fibers, extending as far as the fracture at the edge of the tape. Such a fracture would then cause the tape to be destroyed, which would no longer fulfil its anticreep function. To avoid these overlaps, it would be necessary to lay the unidirectional tape edge to edge, that is to say without a clearance. However, to wind a tape without a clearance is virtually impossible because of the following reasons: the precision of existing tape winders (pitch control, tension variation in the tape laid, resulting in a variation in tape width), the geometry of the pipe (tolerance on the diameter) and the sag of the pipe (slightly domed shape of the pipe under its own weight during the taping operations in the tape winder), etc.

SUMMARY OF THE INVENTION

The object of the invention is to propose a tape which makes it possible to solve the abovementioned problems, to satisfactorily manage the winding clearances and to achieve satisfactory taping in order to obtain a layer intended to prevent the sheath that covers it from creeping, or, more generally, to produce other windings constituting one layer of a pipe.

The object of the invention is achieved by means of a flat textile tape, intended to produce, by helical winding, one layer of a flexible pipe for transporting hydrocarbons, serving to convey, especially under water, a pressurized fluid, the pipe consisting of unbonded layers, these being partly metallic and/or made of composites and partly polymeric, characterized in that the textile tape used to produce these windings is a tape having edges that are thinned over a certain width so as to allow an overlap of the thinned edges that does not result in an appreciable overthickness. In other words, the tape is formed from a central section with an approximately rectangular cross section and from two longitudinal edges that are thinner than the central section. Advantageously, the thickness of the edges is uniform and approximately equal to one half of the thickness of the central section; their width is advantageously between 5% and 15%, preferably in the region of 10%, of the width of the central section.

The thinning of the overlapping edges is known per se, in fields very remote from the invention, for example in assemblies of clinkered boards or from document JP 59035924 which discloses a multilayer resin tape for forming a transparent tube that will then be sectioned to form containers. The tape is produced with thinning of the lateral edges and it is wound without any clearance on itself with welding of the edges. This is the constituent tape of the tube itself, but in no way a tape constituting a single layer of a flexible pipe for hydrocarbons, comprising metal layers and polymeric layers. In addition, the tape is made of a uniform resin and is not a textile tape, the method of manufacture of which is completely different.

Advantageously, the tape is formed by a single thickness of filament roving having different dimensions in the central part and in the edges.

Advantageously, the tape is provided with a tracer in the region of the boundary between the central part and the edges so as to be able to visually control the quality of the winding and of the overlap of the edges.

The invention also relates to the flexible pipe for hydrocarbons, at least one layer of which is obtained by the winding of flat textile tapes according to the invention.

This relates in particular to a flexible pipe for hydrocarbons, of the unbonded offshore type, and the tape may be used as suggested above for producing an anticreep band between the pressure sheath and the pressure vault, in particular for dynamic-type applications (for risers) and essentially for production pipes (through which a hot fluid flows) which lead to the use of sheaths made of semicrystalline polymer, with creep and fracture problems that this entails and which have already been mentioned. The invention applies most particularly to what are called rough-bore pipes, which are mainly used in production, but also to what are called smooth-bore pipes (the internal carcass being coated with an inner sheath), especially in what are called "kill and choke line" pipes which are small-diameter flexible couplers called "jumpers" located at platforms.

In the application as an anticreep layer, several layers of tape are generally laid in order to obtain the quantity of fiber necessary for the pressure of creep of the sheath (the plies being offset). The helical winding is preferably carried out with a short pitch. The tape may have any width, but it is preferable to use wide tapes for obvious coverage and manufacturing reasons.

The textile tape according to the invention may receive other applications and constitute, for example, one or more reinforcing layers wound with a short pitch around tension armor plies of the pipe in order to prevent them from swelling due to the inverse end effect (shortening of the pipe due to the external hydrostatic pressure, causing compression in the armor wires).

BRIEF DESCRIPTION OF THE DRAWINGS

Other features and advantages of the invention will become apparent on reading the following description of several illustrative examples, with reference to the appended drawings in which:

FIG. 1 is a perspective view of a pipe that includes anticreep layers produced by winding a tape according to the invention;

FIG. 2 is a perspective view of a first embodiment of a flat tape according to the invention;

FIGS. 3 and 4 are sectional views of a second and third embodiment of a flat tape according to the invention;

FIG. 5 is a sectional view of a winding of the tape of the second embodiment, showing the overlap of the edges;

FIG. 6 is a sectional view of a fourth embodiment of the invention; and

FIG. 7 is a perspective view of a conventional pipe for transporting hydrocarbons, to which the invention applies.

DESCRIPTION OF THE PRIOR ART

The conventional construction of an unbonded flexible pipe for hydrocarbon transport will be briefly recalled with reference to the appended FIG. 7, which shows a pipe of the rough-bore type comprising, from the inside outward: a metal carcass 101, generally produced by an interlocked metal strip wound helically around the axis AA of the pipe and intended to provide crush resistance under external pressure; a polymeric inner sealing sheath 102, called the pressure sheath; a metal pressure vault 111, consisting here conventionally of the helical winding with a short pitch (winding angle generally close to 90° relative to the axis of the pipe) and an interlocked profiled metal wire 103 covered, if necessary, by the short-pitch helical winding of a hoop reinforcement wire 104; armor 105 resistant to axial tension in the longitudinal direction of the pipe and conventionally consisting of one or more pairs of crossed plies 109,110 in the long-pitch winding (typically less than 60° with respect to the axis of the pipe); and a polymeric outer sealing sheath 108. Other intermediate layers, such as the layers 106, 107, may be provided depending on the type and application of the pipe. Likewise, certain layers may be absent depending on the application for which the pipe is intended. In the case of a smooth-bore pipe, the sealing sheath or pressure sheath constitutes the innermost element of the pipe. The winding of the profiled wire 103, forming the vault located above the pressure sheath, whatever its shape, leaves a certain inter-turn gap allowing the pipe to bend.

DESCRIPTION OF PREFERRED EMBODIMENTS

FIG. 1 shows an example of how the invention is applied to the production of an anticreep layer. This shows, highly symbolically, a pipe 1 for transporting pressurized fluids, consisting of the pressure sheath 2 (similar to the layer 102) and a pressure vault 5, (similar to the layer 103), the outer layers of the pipe (carcass, armor plies, outer sheath) having been omitted for the sake of clarity of the drawing. Between the pressure sheath 2 and the pressure vault 5 there is a first ply 3 and a second ply 4 of textile tape according to the invention, these being intended to prevent the layer 2 from creeping into the inter-turn gaps of the vault 4. The anticreep plies 3 and 4 are produced by winding a flat tape 10 according to the invention with a short pitch, the lay angle being typically greater than 70°, or even 80°, with respect to the longitudinal axis of the pipe. As may be seen in FIG. 5, the overlap of the edges of the adjacent turns of the tape 10 prevent the formation of through-gaps in the layer obtained.

FIGS. 2 to 4 show three tape embodiments that differ by the arrangement of the thin edges. For the sake of clarity of the drawings, the width of the edges relative to that of the central section of the tape has been exaggerated in the drawings.

The tape 10 of the invention, having a mean width L+l, consists of a central section 11 with a rectangular cross section, of width L and thickness E, flanked laterally by two longitudinal edges or flanges 12, with a width l and thickness e. It is preferable that: e=E/2 and L/20<l<3L/20.

The flanges 12 may be placed at mid-height of the edges of the central section 11 (FIG. 2), either so as to alternate at the top and bottom of the two edges of the central section 11 (FIGS. 3 and 5) or exclusively at the bottom (or at the top) of the two edges of the central section 11, or in any other arrangement. Although the arrangement shown in FIGS. 3 and 5 is that which lends itself most naturally to the overlapping of the edges 12, the other arrangements are suitable in practice, owing to the flexibility of the tape and to its deformation during winding.

As shown in FIG. 2, and, more schematically, in FIGS. 3 to 5, the tape of the invention is a textile tape formed from layers of filament rovings 14 held in place by binding means 15. It is formed, for example, in accordance with the teaching of document EP 0 853 547, from layers of filament rovings 14 joined together and held in place by binding means 15 and a bonding material so as to maintain a high overall density, for example at least 39%. The bonding material, for example a thermoplastic, coating the filament rovings has not been shown. However, the tape may also be formed only by the weaving of filament rovings with a weft yarn, but with no bonding material. In the case of a woven tape with no bonding material, the density is advantageously kept high, for example at least 39%. The filament rovings 14 used as warp yarn may be of any type, such as those made of aramid (Kevlar®, Twaron® or Technora®) or made of carbon, for example. The edges 12 are made of the same material as the central section, simply with a smaller thickness, and therefore for example with a fewer number of layers of filament rovings. According to the invention, it is advantageous for the binding means (weft yarns) to be spaced out so as, when the pipe bends, to allow the wound tapes to untwist and their longitudinal fibers to be reorganized. Alternatively, the edges may be produced from fibers having physical or chemical characteristics different from those of the central part. In particular, it will be possible to use fibers whose elongation at break is greater than that of the fibers used in the central part. It will also be possible to use fibers that differ in the nature or the degree of twisting of the filament rovings used, or a different density.

As illustrated in FIG. 5, the tape 10 of the invention makes it possible to accommodate the overall clearance during taping, by at least partially overlapping the edges 12 of the adjacent tapes. This at least partial overlapping of the edges 12 prevents the formation of through-gaps (over the entire thickness of the reinforcing layer) between two tapes. At the very most, a gap 13 smaller than the width l of the edge is formed, which gap is not a through-gap. In FIG. 1, this gap 13 has been shown only for the first turn.

The embodiment of the tape 10 of FIG. 6 differs from that of FIG. 2 in that, instead of being produced by several thicknesses of filament rovings, it is produced only by weaving in two dimensions (warp yarns and weft yarns), with a single thickness of filament rovings 14, 14'. The rovings 14 of the central part 11 are of larger size than the rovings 14' of the thin edge parts 12.

It is also advantageous to provide a tracer on the tape 10, for example a colored yarn 16, which allows the position of the tape during winding to be displayed. This yarn 16 is advantageously placed between the edge 12 and the central part 11 of the tape (this yarn has been illustrated only in FIG. 6, but it may apply to all the embodiments) in order to define the interface. Thus, it is possible to visually check that no tape edge 12 overlaps a central tape part 11 (there must always be two tracers 16 side by side; no tracer 16 must be covered if the winding has been carried out correctly).

Only the application to the production of an anticreep layer between pressure sheath and pressure vault of the pipe has been shown in detail, but the tape according to the invention may be used for other layers of a pipe, especially a reinforcing layer wound around armor plies 109, 110 of the pipe shown in FIG. 7, or between these plies 109, 110.

The invention claimed is:

1. A pipe for transporting hydrocarbon in pressurized fluid form, wherein the pipe is comprised of a plurality of unbonded layers and the layers are partly metallic or are comprised of composites and are partly polymeric;

the pipe having at least one layer of the plurality of unbonded layers comprising a textile tape having a substantially flat cross section that is formed in the pipe as a helical winding, wherein the tape includes a central section having a first thickness and an approximately rectangular cross-section; and the tape further includes two separate and separated lateral longitudinal edge regions at respective opposite sides of the central section, each of the lateral longitudinal edge regions having a thickness that is less than the first thickness of the central section; wherein the central section and the two separate and separated lateral longitudinal edge regions have the same textile structure and wherein the tape is wound in a helical winding with at least partial overlapping of the lateral longitudinal edge regions of successive ones of the windings.

2. The pipe of claim 1, wherein the tape has a lay angle greater than 70°.

3. The pipe of claim 1, wherein the tape has a lay angle greater than 80°.

4. The pipe of claim 1, wherein the lateral longitudinal edge regions of the tape are comprised of fibers having first physical or chemical characteristics and the central section is comprised of fibers having second physical or chemical characteristics which differ from the first physical or chemical characteristics.

5. The pipe of claim 1, wherein the layers of the pipe include a pressure sheath layer and a pressure vault layer outward of the pressure sheath layer; and the at least one layer comprising the flat textile tape is an anti-creep layer wound between the pressure sheath layer and the pressure vault layer.

6. The pipe of claim 1, wherein the layers of the pipe include an armor ply; and the at least one layer comprising the flat textile tape is a reinforcing layer wound around the armor ply.

7. The pipe of claim 6, wherein there are a plurality of the armor ply layers, and the at least one layer comprising the flat textile tape is wound between two of the armor ply layers.

* * * * *